(12) United States Patent
Jarrus

(10) Patent No.: US 6,502,831 B2
(45) Date of Patent: Jan. 7, 2003

(54) BALL JOINT WITH SEAL

(75) Inventor: Peter S. Jarrus, Rochester Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/772,057

(22) Filed: Jan. 29, 2001

(65) Prior Publication Data

US 2002/0101042 A1 Aug. 1, 2002

(51) Int. Cl.[7] ................................................ F16J 15/52
(52) U.S. Cl. ...................................... 277/635; 403/134
(58) Field of Search ................................ 277/634–637, 277/641, 910; 403/133, 134

(56) References Cited

U.S. PATENT DOCUMENTS

| | | | |
|---|---|---|---|
| 2,921,809 A | * | 1/1960 | Kogstrom |
| 2,971,787 A | * | 2/1961 | Lincoln |
| 3,147,537 A | * | 9/1964 | Fadow |
| 3,175,834 A | * | 3/1965 | Wallace et al. |
| 3,208,779 A | * | 9/1965 | Sullivan, Jr. |
| 3,279,833 A | * | 10/1966 | Ihnacik, Jr. |
| 3,279,834 A | * | 10/1966 | Budzynski |
| 3,292,957 A | * | 12/1966 | Ulderup |
| 3,381,987 A | * | 5/1968 | Husen |
| 3,472,540 A | * | 10/1969 | Gottschald |
| 4,121,844 A | * | 10/1978 | Nemoto et al. |
| 4,163,617 A | | 8/1979 | Nemoto |
| 4,220,418 A | * | 9/1980 | Kondo et al. |
| 4,856,795 A | * | 8/1989 | DeLano et al. |
| RE34,341 E | * | 8/1993 | Fukumura et al. |
| 5,509,749 A | | 4/1996 | Eifert et al. |
| 5,630,672 A | | 5/1997 | McHale |
| 5,713,689 A | | 2/1998 | Pazdirek et al. |
| 6,092,954 A | | 7/2000 | Mizutani |

FOREIGN PATENT DOCUMENTS

WO        WO 01/42670 A2 *   6/2001

* cited by examiner

Primary Examiner—Chuck Y. Mah
Assistant Examiner—Alison K. Pickard
(74) Attorney, Agent, or Firm—Tarolli, Sundheim, Covell, Tummino & Szabo L.L.P.

(57) ABSTRACT

A ball joint (10) for interconnecting first and second vehicle portions (12, 14) for relative movement comprises a socket (30) for connection with the first vehicle portion and a ball stud (40) for connection with the second vehicle portion. The ball stud (40) has a ball end portion (42) received in the socket (30) to support the ball stud for movement relative to the socket. The ball stud (40) also has a shank portion (50) centered on an axis (56) and projecting from the socket (30). The ball joint (10) includes an annular seal (70) having a first end portion (72) connected with the socket (30) and a second end portion (74) connected with the shank portion (50) of the ball stud (40) to seal between the socket and the ball stud. The seal (70) includes a first seal member (80) and a second seal member (90). The first seal member (80) extends between and interconnects the first and second end portions (72, 74) and is made from a first elastomeric material. The second seal member (90) is supported on the first seal member (80) and is made from a second elastomeric material different from the first elastomeric material. The second seal member (90) has a surface portion (100) in sealing engagement with the shank portion (50) of the ball stud (40).

5 Claims, 2 Drawing Sheets

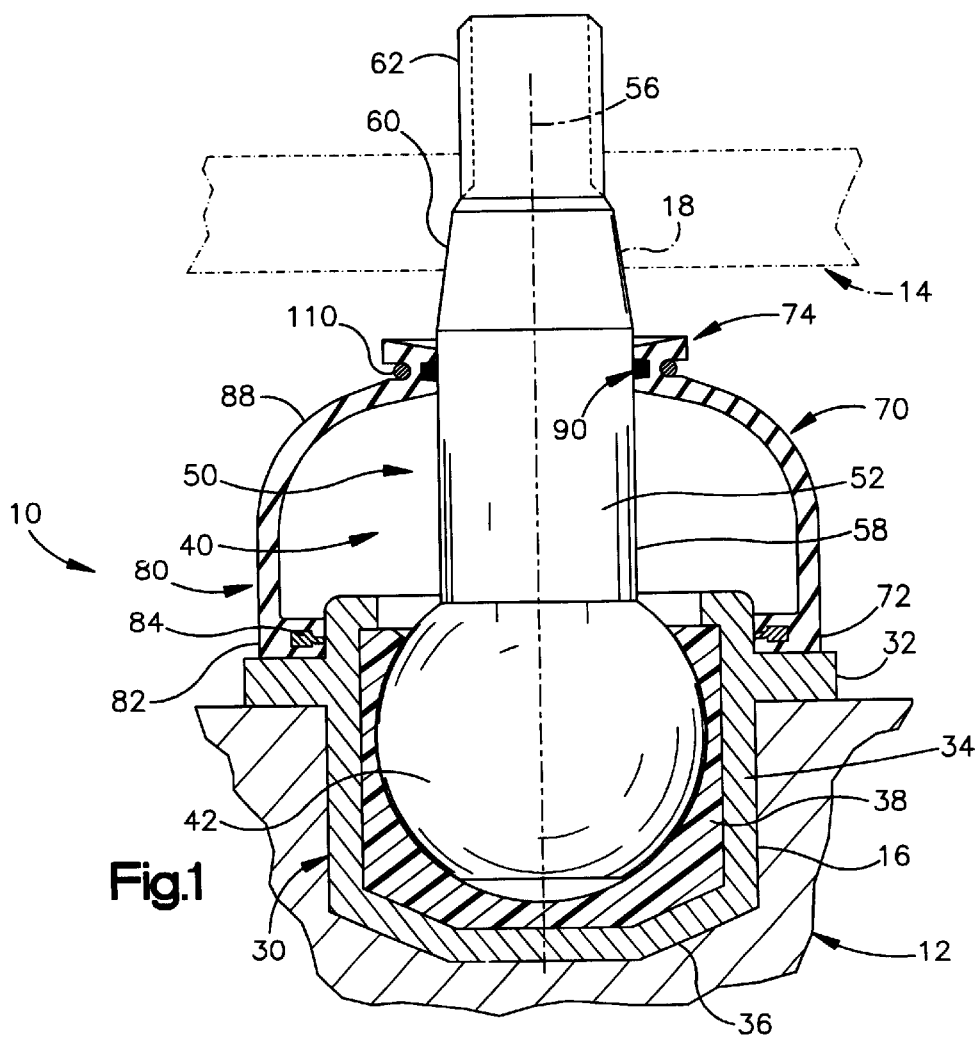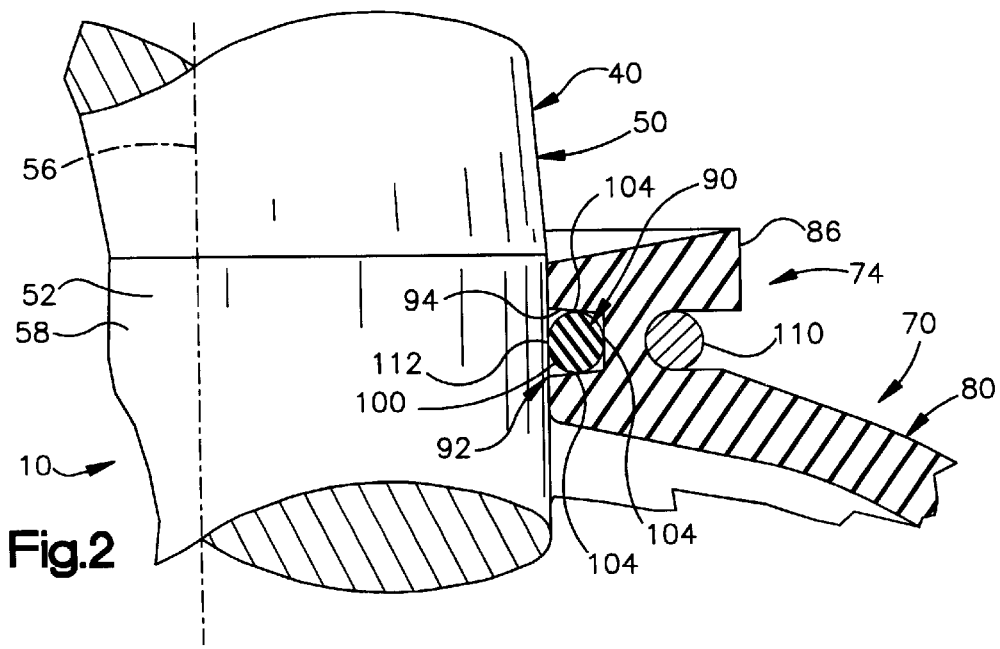

BALL JOINT WITH SEAL

BACKGROUND OF THE INVENTION

1. Technical Field

The present invention relates to a ball joint and, in particular, to a seal for a ball joint.

2. Description of the Related Art

A typical ball joint includes a socket and a ball stud. The ball stud has a ball end portion received in the socket and a shank portion projecting from the socket. The socket supports the ball stud for pivotal and/or rotational movement relative to the socket. The ball joint also includes a seal that has a first end portion that seals against the socket. A second end portion of the seal seals against the shank portion of the ball stud. The seal prevents lubricant from coming out of the ball joint and also prevents dirt and other items from entering into the ball joint.

SUMMARY OF THE INVENTION

The present invention is a ball joint for interconnecting first and second vehicle portions for relative movement. The ball joint comprises a socket for connection with the first vehicle portion and a ball stud for connection with the second vehicle portion. The ball stud has a ball end portion received in the socket to support the ball stud for movement relative to the socket. The ball stud also has a shank portion centered on an axis and projecting from the socket. The ball joint includes an annular seal having a first end portion connected with the socket and a second end portion connected with the shank portion of the ball stud to seal between the socket and the ball stud. The seal includes a first seal member and a second seal member. The first seal member extends between and interconnects the first and second end portions and is made from a first elastomeric material. The second seal member is supported on the first seal member and is made from a second elastomeric material different from the first elastomeric material. The second seal member has a surface portion in sealing engagement with the shank portion of the ball stud.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a sectional view of a ball joint constructed in accordance with a first embodiment of the present invention;

FIG. 2 is an enlargement of a portion of FIG. 1;

DETAILED DESCRIPTION OF THE INVENTION

Figure 3:
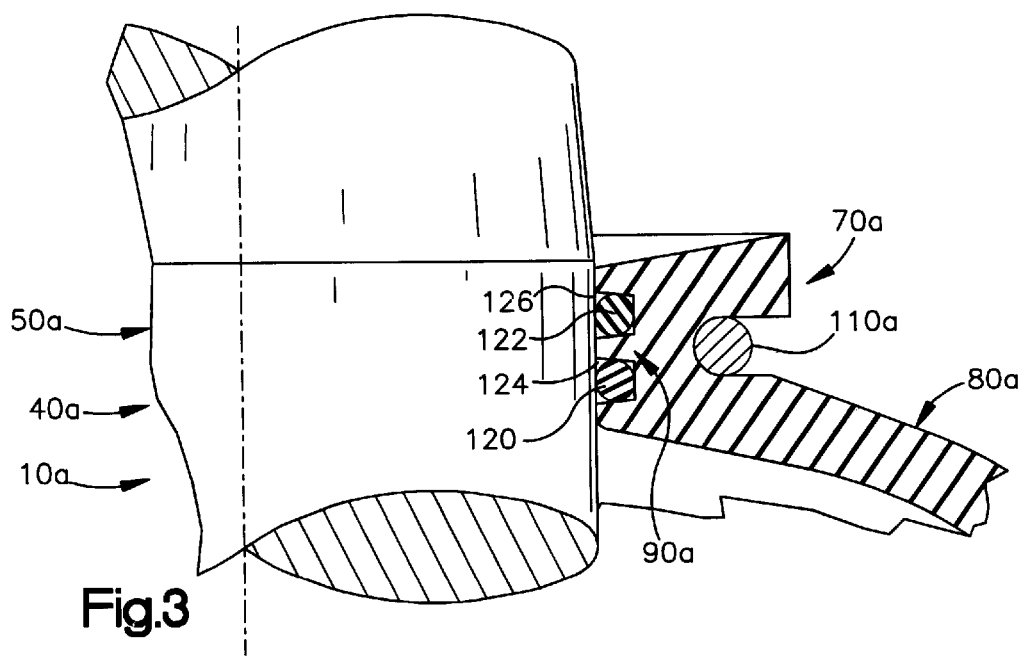
FIG. 3 is a view similar to FIG. 2 showing a portion of a ball joint constructed in accordance with a second embodiment of the invention.

The present invention relates to a ball joint for supporting a first vehicle portion for movement relative to a second vehicle portion. The present invention is applicable to various ball joint constructions. As representative of the invention, FIG. 1 illustrates a ball joint 10. The ball joint 10 is located between a first vehicle portion shown partially at 12 and a second vehicle portion shown schematically and partially at 14.

The first vehicle portion 12 may be a steering knuckle or steering yoke, for example. The first vehicle portion 12 has a cylindrical opening 16 for receiving the ball joint 10. The second vehicle portion 14 may be a control arm or steering yoke or steering knuckle, for example. The second vehicle portion 14 has a frustoconical surface that defines a tapered bore or opening indicated at 18.

The ball joint 10 is generally of a conventional construction and includes a socket 30 and a steel ball stud 40. A mounting flange 32 extends radially outward from a side wall 34 of the socket 30, adjacent to a closed lower end 36 of the socket. The socket 30 is mounted in the opening 16 in the first vehicle portion 12.

A bearing 38 is located in the socket 30. A ball end portion 42 of the ball stud 40 is received in the bearing 38. The ball end portion 42 of the ball stud 40 is pivotable and rotatable in the bearing 38 to provide for relative movement between the first vehicle portion 12 and the ball stud 40.

The ball stud 40 has a shank portion 50 than projects from the ball end portion. The shank portion 50 has a cylindrical first section 52 centered on a longitudinal central axis 56 of the ball stud 40. The first section has a cylindrical outer surface 58. The shank portion 50 also has a second section 60 that has a tapered outer surface centered on the axis 56. The shank portion 50 also has a threaded end section 62.

When the ball joint 10 is assembled with the second vehicle portion 14, the tapered portion 60 of the shank 50 is fitted in the tapered opening 18 in the second vehicle portion in a tight, force-fitting connection. A nut (not shown) is screwed on the threaded end section 60 of the ball stud 40 to secure the connection.

The ball joint 10 further includes a seal 70. The seal 70 extends between the socket 30 and the first section 52 of the ball stud 40.

The seal 70 has a first end portion 72 connected with the socket 30 and a second end portion 74 connected with the ball stud 40. The seal 70 includes a first seal member 80 and a second seal member 90.

The first seal member 80 is made from a first elastomeric material. The first elastomeric material is selected to have good flex fatigue life, puncture resistance, and abrasion resistance, etc.

The first seal member 80 has a first end portion 82 connected with the socket 30. The first end portion 82 seals against the socket 30 and forms the first end portion 72 of the seal 70. The first end portion 82 may be secured to the socket 30 with a ring spring or an integral washer 84, for example, or other device.

The first seal member 80 has a second end portion 86. The second end portion 86 of the first seal member 80 is adjacent to and connected with the shank portion 50 of the ball stud 40 in a manner described below. The second end portion 86 of the first seal member 80 forms part of the second end portion 74 of the seal 70.

The first seal member 80 also has a main body portion 88. The main body portion 88 of the first seal member 80 extends between and interconnects the first end portion 72 of the seal 70 and the second end portion 74 of the seal. The main body portion 88 of the first seal member 80 forms a main body portion of the seal 70 itself.

The second seal member 90 is supported on the second end portion 86 of the first seal member 80. The second seal member 90 forms a part of the second end portion 74 of the seal 70.

The second seal member 90 is made from a second elastomeric material, different from the first elastomeric material of which the first seal member 80 is made. The second elastomeric material is selected to provide optimal sealing qualities for sealing against the ball stud 40 while the ball stud moves relative to the socket 30.

In the embodiment illustrated in FIGS. 1 and 2, the second seal member 90 is an O-ring located in a groove 92 in the first seal member 80. The groove 92 is interposed between first and second annular sealing portions of said first seal member 80. The first and second sealing portions encircle the shank 50 portion of the ball stud and remain in circumferential sealing engagement with the shank while the ball stud moves relative to the socket. The groove 92 has three side surfaces 94 that define the groove. The O-ring 90 has an outer side surface 100 that contacts the first seal member 80 at three circular tangent lines 104 on the three sides 94 of the groove 92.

A metal ring spring 110, located radially outward of the groove 92, exerts radially inwardly directed force to press the second seal member 90 against the outer side surface 58 of the cylindrical section 52 of the ball stud 40. The outer surface 100 of the O-ring 90 contacts the outer surface 58 of the cylindrical section 52 of the ball stud 40 at a circular tangent line 112.

The engagement of the second seal member 90 with the ball stud 40 seals in lubricant that is contained in the ball joint 10. The engagement of the second seal member 90 with the ball stud 40 also prevents the ingress of any material from outside the ball joint 10, such as dirt or oil.

FIG. 3 illustrates a portion of a ball joint 10a constructed in accordance with a second embodiment of the invention. Many parts of the ball joint 10a are similar to parts of the ball joint 10, and are given the same reference numerals with the suffix "a" added.

In the embodiment illustrated in FIG. 3, the second seal member 90a comprises two O-rings 120 and 122. The first O-ring 120 is located in a first groove 124 in the first seal member 80a. The first O-ring 120 is exposed to the interior of the ball joint 10. The material qualities of the first O-ring 120 are optimized to block flow of lubricant out of the ball joint 10.

The second O-ring 122 is located in a second groove 126 in the first seal member 80a, outward of the first O-ring 120. The second O-ring 122 is exposed to the environment around the ball joint 10. The material qualities of the second O-ring 122 are optimized to block flow of environmental impurities, such as dirt, into the ball joint 10.

Figure 4:
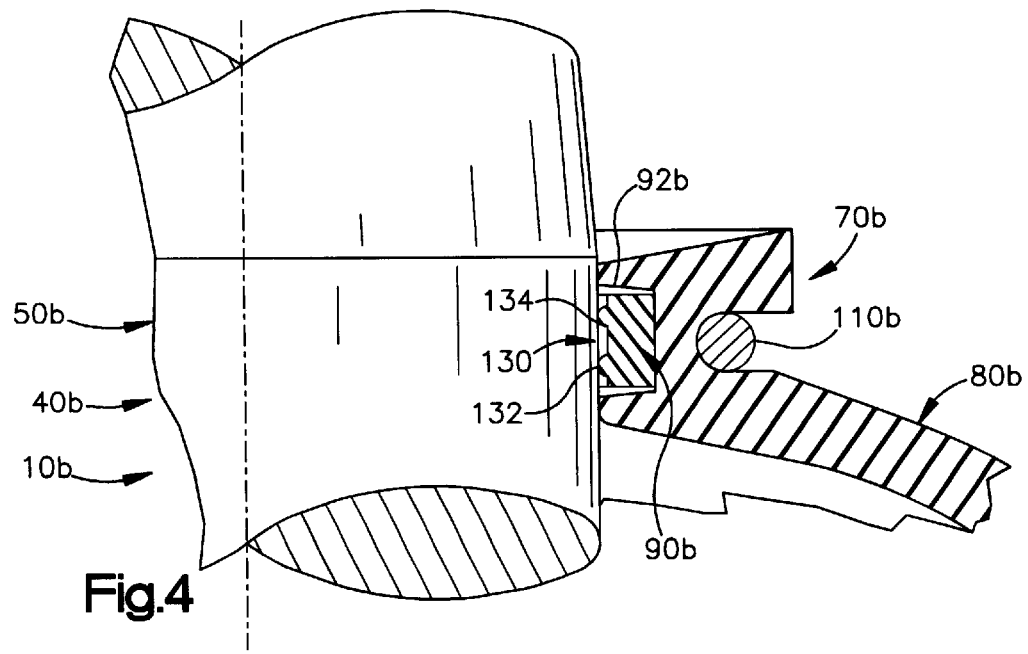
FIG. 4 is a view similar to FIG. 2 showing a portion of a ball joint constructed in accordance with a third embodiment of the invention.

FIG. 4 illustrates a portion of a ball joint 10b constructed in accordance with a third embodiment of the invention. Many parts of the ball joint 10b are similar to parts of the ball joint 10, and are given the same reference numerals with the suffix "b" added.

In the embodiment illustrated in FIG. 4, the second seal member 90b comprises a seal ring 130 with two sealing ribs 132 and 134. The seal ring 130 has a rectangular cross-sectional configuration and is located in a groove 92b in the first seal member 90b. The first rib 132 of the seal ring 130 is exposed to the interior of the ball joint 10b. The second rib 134 of the seal ring 130 is exposed to the environment around the ball joint 10b.

From the above description of the invention, those skilled in the art will perceive improvements, changes and modifications in the invention. Such improvements, changes and modifications within the skill of the art are intended to be covered by the appended claims.

Having described the invention, I claim:

1. A ball joint for interconnecting first and second vehicle portions for relative movement, said ball joint comprising:

a socket for connection with the first vehicle portion and a ball stud for connection with the second vehicle portion;

said ball stud having a ball end portion having a center received in said socket;

a bearing between said socket and said ball end portion supporting said ball stud for pivotal movement about the center in all directions relative to said socket;

said ball stud having a shank portion centered on an axis and projecting from said socket, said shank portion being pivotal in all directions about the center;

a first seal member being made from a first elastomeric material and having a first end portion connected with said socket and a second end portion connected with said shank portion of said ball stud, said second end portion of said first seal member including an annular groove;

said annular groove being interposed between first and second annular sealing portions of said first seal member, said first and second annular sealing portions encircling said shank portion and being in circumferential sealing engagement with said shank portion of said ball stud in all pivotal positions of said shank portion; and a second seal member being supported within said annular groove of said first seal member and being made from a second elastomeric material different from said first elastomeric material, said second seal member encircling said shank portion and being in circumferential sealing engagement with said shank portion of said ball stud in a location between said first and second annular sealing portions of said first seal member and in all pivotal positions of said shank portion.

2. A ball joint as set forth in claim 1 wherein said second seal member is an O-ring.

3. A ball joint as set forth in claim 1 wherein said second seal member comprises a plurality of separate seal members.

4. A ball joint as set forth in claim 3 wherein said plurality of separate seal members comprises a plurality of O-rings.

5. A ball joint as set forth in claim 1 wherein said second seal member comprises a seal ring having a plurality of seal ribs.

\* \* \* \* \*